Patented Dec. 9, 1930

1,784,452

UNITED STATES PATENT OFFICE

CARL KRAUSS, OF LEVERKUSEN, NEAR COLOGNE-ON-THE-RHINE, GERMANY, ASSIGNOR TO GENERAL ANILINE WORKS, INC., OF NEW YORK, N. Y., A CORPORATION OF DELAWARE

INDIGOID VAT DYESTUFFS FROM DIHALOGENO-ALKYLISATINS

No Drawing. Application filed October 23, 1926, Serial No. 143,796, and in Germany November 25, 1925.

The present invention relates to new indigoid vat dyestuffs and to process of preparing the same; more particularly it relates to dyestuffs of the following general formula:

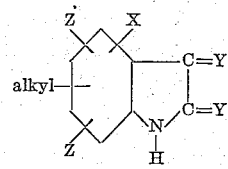

wherein Z represents a halogen atom having an atomic weight of between 35 and 80, X represents hydrogen or alkyl, one Y represents oxygen, the other Y stands for the residue of a cyclo-keto-methylene compound.

These novel dyestuffs are dark colored powders, they are soluble in concentrated sulfuric acid with characteristic coloration and they form with hydrosulfite solutions usually yellow colored vats from which cotton is dyed fast shades ranging from a bright red to deep navy blue shades.

They may be prepared, for instance, by condensing di-halogeno-alkyl-isatin or a di-halogeno-alkyl-isatin compound in which the alpha carbon atom is substituted by a reactive substituent with a cyclo-keto-methylene compound.

Reactive substituents are for instance halogen atoms, particularly chlorine, sulfur, arylamino groups, alkoxy groups, etc. Compounds of this type may be exemplified by the following:—5-bromo-6-chloro-7-methylisatin-alpha-chloride:

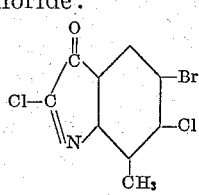

5-7-dichloro-6-methylisatin-alpha-anilid:

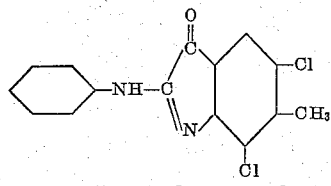

The term "cyclo-keto-methylene compounds is intended to comprise such aromatic compounds as contain a desmotropic oxy group, as for instance alpha-naphthol, 4-chloro-1-naphthol, anthrol, which supposedly react in their tautomeric keto-methylene form:

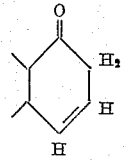

oxy-thionaphthenes of the general formula:

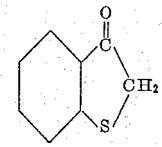

oxy-naphtho-thiophenes, indoxyls, naphthindoxyls, etc.

3-keto-thionaphthene-2-carboxylic acids:

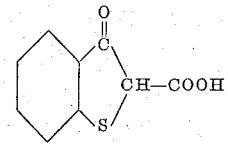

react in a similar manner, carbon dioxide being split off during the reaction and such carboxylic acids are, for purposes of this invention, considered equivalent with the oxy-thionaphthenes themselves.

The condensation of the isatin or the alpha substituted isatin compounds with the cyclic-keto methylene compounds proceeds very readily, because the CO-group in 3-position or the alpha substituent react with the hydrogen of the methylene carbon with formation of a link between the isatin and the methylene carbon.

The symmetrical indigoid dyestuffs can also be produced by reducing two molecular proportions of such dihalogeno-alkyl-isatin compounds which contain a reactive substituent in alpha position. The production of such symmetrical indigo dyestuffs by this reduction method and certain of the novel products are described and claimed in my copending application, Serial No. 144,191 filed on even date which has matured into Patent No. 1,698,233 dated Jan. 8, 1929.

The following examples will further illustrate my invention, the parts being by weight; it is however understood that my invention is not limited to the specific materials and particular reacting conditions mentioned therein.

*Example 1.*—27.5 parts 5-bromo-6-chloro-7-methyl-isatin are introduced into 400 parts chlorobenzene and heated with stirring for two hours at 90° C. with 25 parts phosphorus pentachloride, a solution of the 5-bromo-6-chloro-7-methylisatin-alpha-chloride, having the formula:

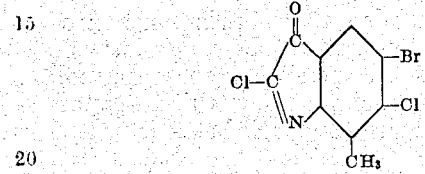

is obtained. Simultaneously a solution of 4-chloro-1-naphthol is prepared as follows: 28.8 parts alpha-naphthol are introduced into 300 parts chloro-benzene and heated for two hours at 70° C. with 28.8 parts sulfurylchloride. The isatin chlorid solution is now cooled to about 70° C. and the naphthol solution to about 20° C. and both are mixed. The reaction mass is gradually cooled to 20° C. and the condensation proceeds readily, the dyestuff separating from the solution. It is filtered off, freed from chlorobenzene and dried. It is a dark blue powder which dissolves in concentrated sulfuric acid with a green coloration and has most probably the formula:

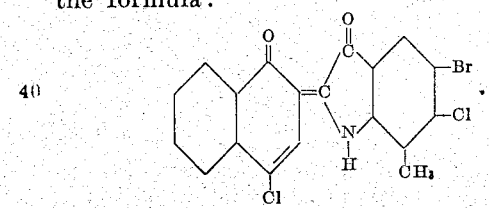

It forms a yellow vat from which cotton is dyed full navy blue shades of excellent fastness properties.

*Example 2.*—27.5 parts 4-chloro-5-bromo-7-methyl-isatin are introduced into 400 parts chlorobenzene and heated with stirring for two hours at 90° C. with 25 parts phosphorus pentachloride, a solution of 4-chloro-5-bromo-7-methylisatin-alpha-chloride, having the formula:

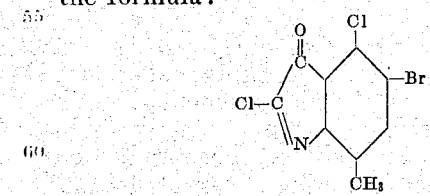

is obtained. A solution of 25 parts alpha-anthrol in 300 parts chlorobenzene is added to the above at about 40° C. The condensation proceeds readily and the dyestuff separates. It is isolated in the usual manner. It is in the dry state a bluish-black powder, soluble in concentrated sulfuric acid with a yellowish-green coloration and has most probably the formula:—

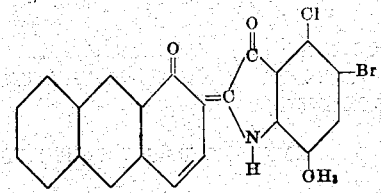

It forms a yellow vat from which cotton is dyed fast, deep greenish-blue shades.

*Example 3.*—23 parts 5-7-dichloro-6-methylisatin are transformed into the alpha chloride in the same manner as described in Example 1. The alpha chloride solution is then added at 70-80° C. to a solution of 20 parts 6-chloro-4-methyl-3-oxythionaphthene in 400 parts chloro benzene. The condensation proceeds readily and the dyestuff is isolated in the usual manner. It is in the dry state a reddish-violet powder, soluble in concentrated sulfuric acid with a green coloration and has most probably the formula:

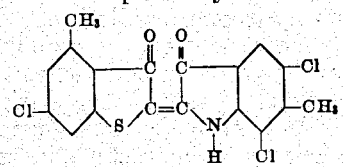

It forms a yellow vat from which cotton is dyed beautiful dark reddish violet shades of excellent fastness properties.

*Example 4.*—23 parts 5-7-dichloro-6-methylisatin are suspended in water and combined at about 80-90° C. with a weakly soda alkaline solution of oxy-thionaphthene carboxylate of sodium of the formula:

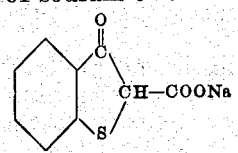

the latter in an amount slightly in excess of the isatin compound. The condensation proceeds very readily and the new dyestuff separates. It is filtered off, washed and dried. It is in the dry state a red powder soluble in concentrated sulfuric acid with a reddish-brown color and has most probably the formula:

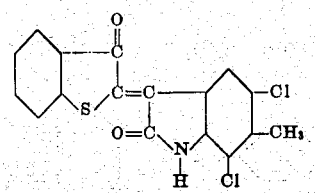

It forms with hydrosulfite a yellow vat from which textile materials are dyed clear, red shades of superior fastness properties.

*Example 5.*—24.4 parts 4-6-dimethyl-5-7-dichloroisatin are dissolved in 400 parts chlorobenzene, 25 parts phosphorus pentachloride are added and the mixture is heated for two hours at 90° C. To the so obtained solution of the alpha chloride a chlorobenzene solution of 4-chloro-1-naphthol is added. The dyestuff separates and is isolated in the usual manner. It is in the dry state a dark blue powder, soluble in concentrated sulfuric acid with a green coloration and has most probably the formula:

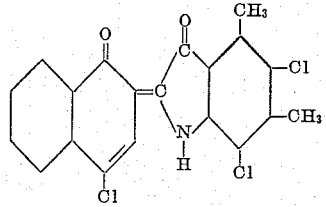

It produces a yellow vat from which cotton is dyed exceedingly fast, beautiful navy blue shades.

I claim:—

1. As new products the indigoid vat dyestuffs of the general formula:

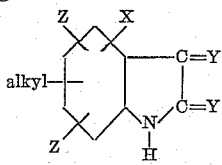

wherein Z represents a halogen atom having an atomic weight of between 35 and 80, X represents hydrogen or alkyl, one Y represents oxygen, the other Y the residue of a cyclo-keto-methylene compound, said products being in the dry state dark colored powders, dyeing textile materials from a generally yellow vat red to blue fast shades.

2. As new products the indigoid vat dyestuffs of the general formula:

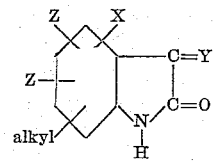

wherein Z represents a halogen atom having an atomic weight of between 35 and 80, X represents hydrogen or alkyl, Y represents the residue of a cyclo-keto-methylene compound, said products being in the dry state dark colored powders, dyeing textile materials from a generally yellow vat red fast shades.

3. As new products the indigoid vat dyestuffs of the general formula:

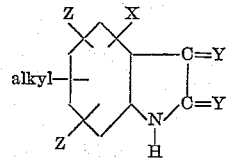

wherein Z represents a halogen atom having an atomic weight of between 35 and 80, X represents hydrogen or alkyl, one Y represents oxygen, the other Y a thio-naphthene residue, said products being in the dry state dark colored powders, dyeing textile materials from a generally yellow vat red to blue fast shades.

4. As a new product the indigoid vat dyestuff of the following formula:

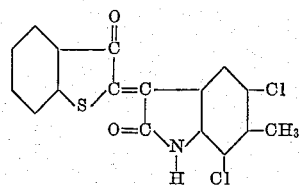

being a red powder, soluble in concentrated sulfuric acid with a reddish brown coloration, dyeing textile materials from a yellow vat, clear red shades of excellent fastness properties.

In testimony whereof I have hereunto set my hand.

CARL KRAUSS.